United States Patent [19]

Nakajima

[11] Patent Number: 4,561,605
[45] Date of Patent: Dec. 31, 1985

[54] BRAKE FOR A FISHING REEL
[75] Inventor: Hideki Nakajima, Sakai, Japan
[73] Assignee: Shimano Industrial Company Limited, Osaka, Japan
[21] Appl. No.: 451,835
[22] Filed: Dec. 21, 1982
[30] Foreign Application Priority Data Dec. 25, 1981 [JP] Japan ............. 56-195139[U]
Dec. 29, 1981 [JP] Japan ............. 56-197683[U]
Oct. 14, 1982 [JP] Japan ............. 57-155863[U]

[51] Int. Cl.[4] .......................................... A01K 89/02
[52] U.S. Cl. ..................... 242/84.52 B; 310/93; 310/105; 188/267
[58] Field of Search ............ 242/84.52 B, 84.53; 310/93, 105; 188/267

[56] References Cited

U.S. PATENT DOCUMENTS 2,361,239 10/1944 Ransom .............. 242/84.52 B
3,120,357 2/1964 Wood, Jr. ............ 242/84.21 A
4,013,241 3/1977 Gray ................. 242/84.52 B
4,327,873 5/1982 Juppet et al. ............. 310/93

Primary Examiner—Billy S. Taylor
Attorney, Agent, or Firm—Stevens, Davis, Miller & Mosher

[57] ABSTRACT

A fishing reel is provided with a spool and a magnetic brake for reducing overrun of the spool. The spool has a frame member which rotatably supports the spool, a cylindrical electric conductor rotatable together with the spool, and a magnet holder having at least one magnet positioned at one side of the holder radially of the conductor and opposite thereto. The holder has a support unit which supports the holder to the frame member so that the magnet can be adjusted radially toward or away from the conductor to thereby adjust the braking of the conductor. The support means includes a control member which controls the holder to move toward the position where the magnet is adjusted.

2 Claims, 14 Drawing Figures

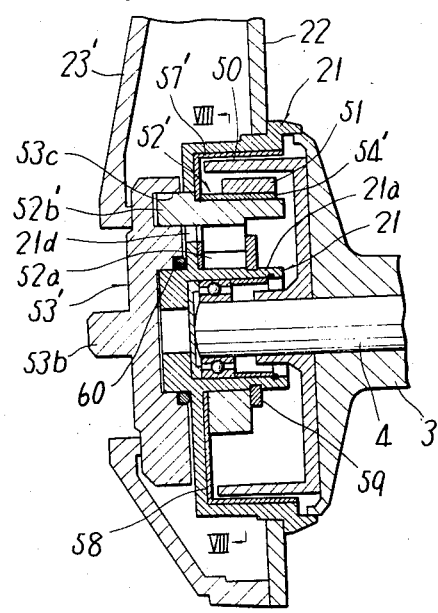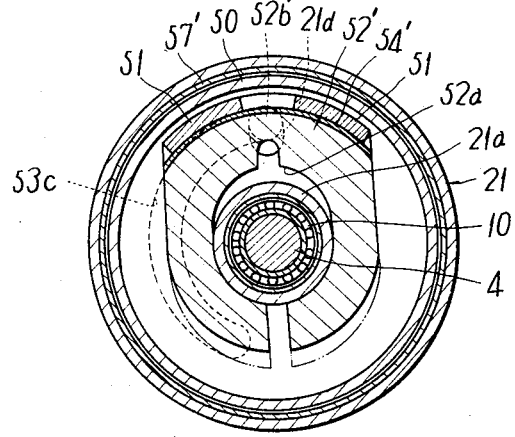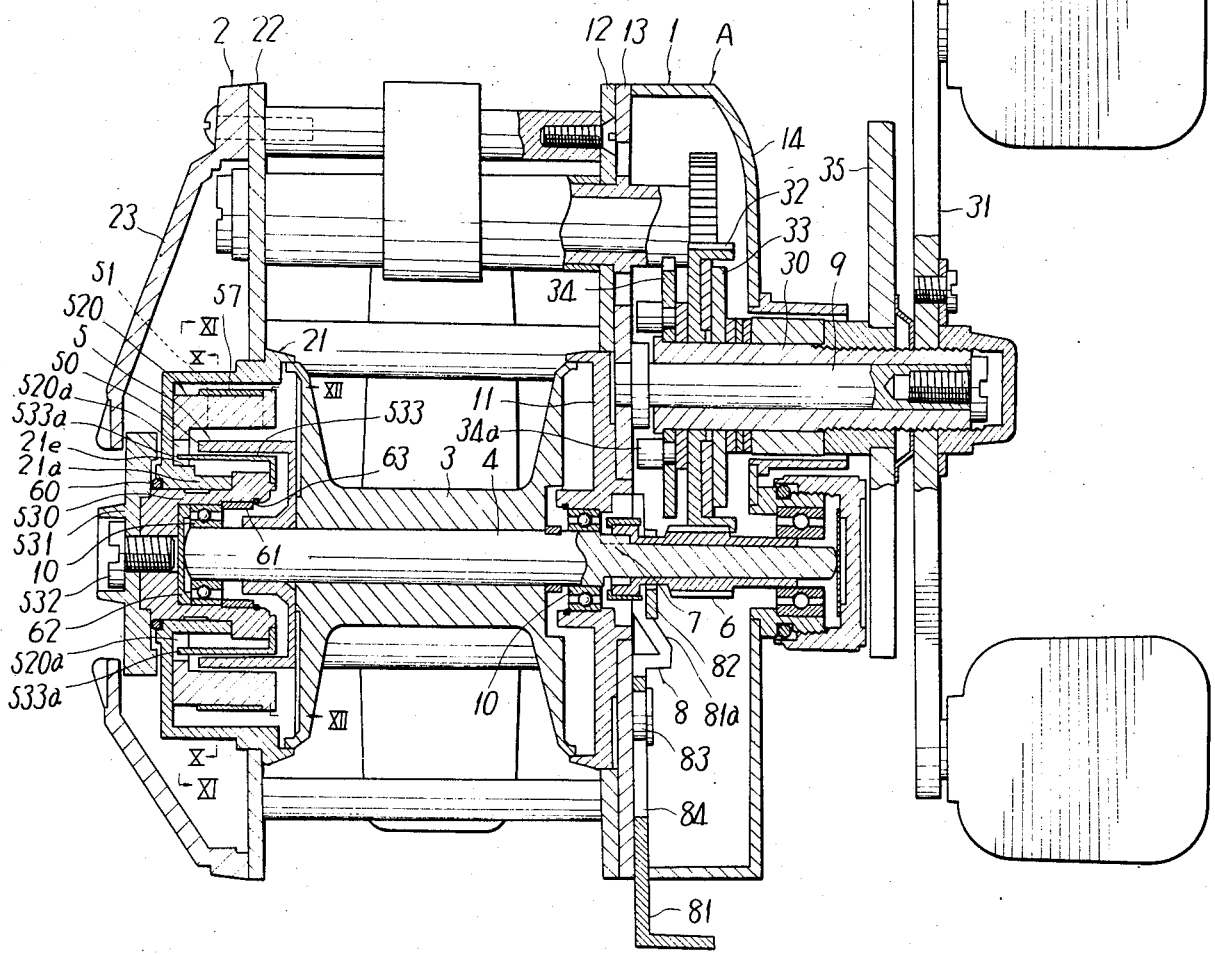

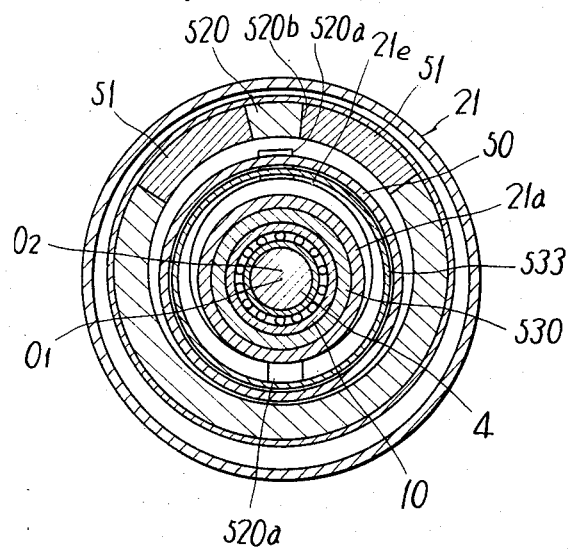
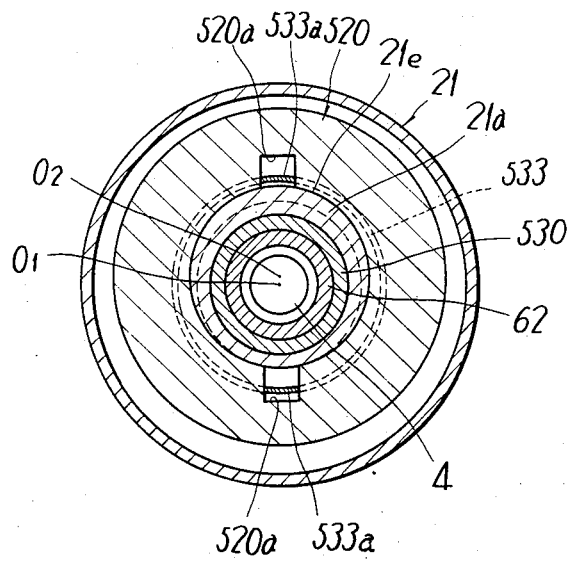
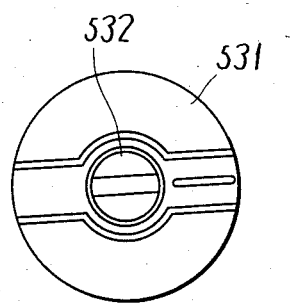
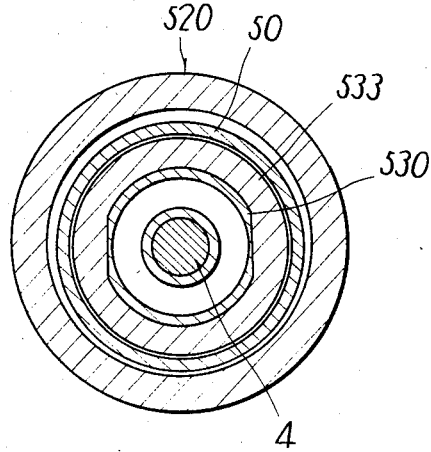
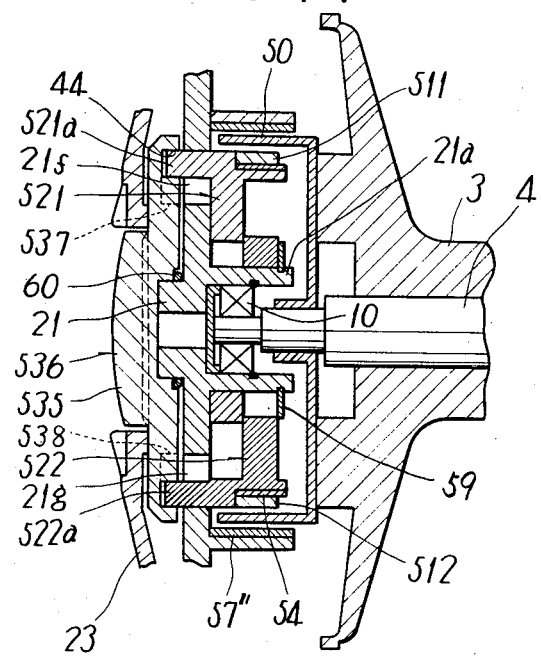

BRAKE FOR A FISHING REEL

FIELD OF THE INVENTION

This invention relates to a fishing reel, and more particularly to a fishing reel having a spool and a magnetic brake for diminishing an overrun of the spool.

BACKGROUND OF THE INVENTION

Generally, a fishing reel, which supports the spool rotatably to a frame, has a clutch means which is coupled to transmit rotation of a handle shaft to the spool shaft, thereby winding a fishing line onto the spool, and which is disconnected to allow the spool shaft to freely rotate for casting.

A fishing rig at the end of the line, when cast, draws by its weight the line out of the spool, in which case the spool tends to rotate at speed higher than that of the drawn-out line so as to overrun and cause a backlash, resulting in that the line gets twisted or enters in a gap between the spool and the reel body. Hence, the reel generally has a brake to avoid such trouble.

The brake is usually formed as employs a centrifugal brake which provides a brake shoe in slidable contact wiith a brake drum for the braking action. Accordingly, there has been the problem in that the braking effect varies due to the intensity of friction of the brake shoe and that the braking effect cannot be adjusted from the exterior of the reel.

For the purpose of solving the above problem, a fishing reel has been proposed which employs a magnet and a metallic electric conductor, one of which is fixed to the reel body and the other of which rotates together with the spool so that an eddy current is generated by the rotating magnetic flux and according to Fleming's left-hand rule a force is imparted to the rotating member against its rotation, thereby exerting the braking action. The fixed member is made movable axially of the spool shaft with respect to the reel body and the braking effect is adjustable from the reel exterior.

This type of brake has no contact portion and is free from the aforesaid variation in the braking effect and is easy to adjust from the exterior, but the magnet or metallic conductor supported to the reel body and movable axially of the spool shaft is hard to adjust with accuracy and a large space is needed to enlarge a range of adjustment, resulting in that the reel is large-sized as a whole.

SUMMARY OF THE INVENTION

An object of the invention is to provide a fishing reel which is simple in construction permitting an easy enlargement of a range of adjusting the braking effect and for the accurate adjustment thereof, and small-sized in spite of the enlarged adjusting range.

A fishing reel of the invention is provided with a spool, frame members rotatably supporting the spool, a cylindrical electric conductor rotatable together therewith, and a magnet holder having at least one magnet positioned at one radial side of the conductor and opposite thereto, the conductor and magnet constituting a magnetic brake. The invention is characterized in that the magnet holder has a support means for the frame member, by which means the magnet is adjusted in position radially close to or away from the conductor to thereby adjust the braking effect exerted thereon, and that the support means includes a control member to move the holder toward the position where the magnet is adjusted.

Furthermore, this invention is characterized in that the magnet at the magnetic brake is adjusted in position not axially but radially with respect to the conductor. Such radial adjustment can obtain an accurate braking effect and enlarge the adjustment range more than an axial adjustment.

The support means includes a construction for supporting the magnet holder radially movably with respect to the conductor, and one for rotating the magnet holder eccentrically with respect to the axis of rotation of the conductor so that the magnet shifts radially of the conductor while moving circumferentially with respect thereto. Hence, it is possible to adjust the position of magnet radially with respect to the conductor.

The support means and the adjustment of the magnet in position will be described in detail below.

These and other objects, features and advantages of the invention will become more apparent upon a reading of the following detailed specification and drawings.

BRIEF DESCRIPTION OF THE DRAWINGS

FIG. 7 is a partially omitted cross-sectional plan view of a modified embodiment of the invention, which is different in adjustment of a magnet holder, FIG. 8 is a sectional view taken on the line VIII—VIII in FIG. 7, FIG. 9 is a cross-sectional plan view of another modified embodiment which is different in a support means for the magnet holder and has a magnet disposed at the outer periphery of an electric conductor, corresponding to FIG. 1, FIG. 10 is a sectional view taken on the line X—X in FIG. 9, FIG. 11 is a sectional view taken on the line XI—XI in FIG. 9, FIG. 12 is a sectional view taken on the line XII—XII in FIG. 9, FIG. 13 is a side view of a control lever only in a control member shown in FIG. 9, and FIG. 14 is a partially sectional view of still another embodiment of the invention, in which the magnet holder is axially juxtaposed.

DETAILED DESCRIPTION OF THE INVENTION

Figure 1:
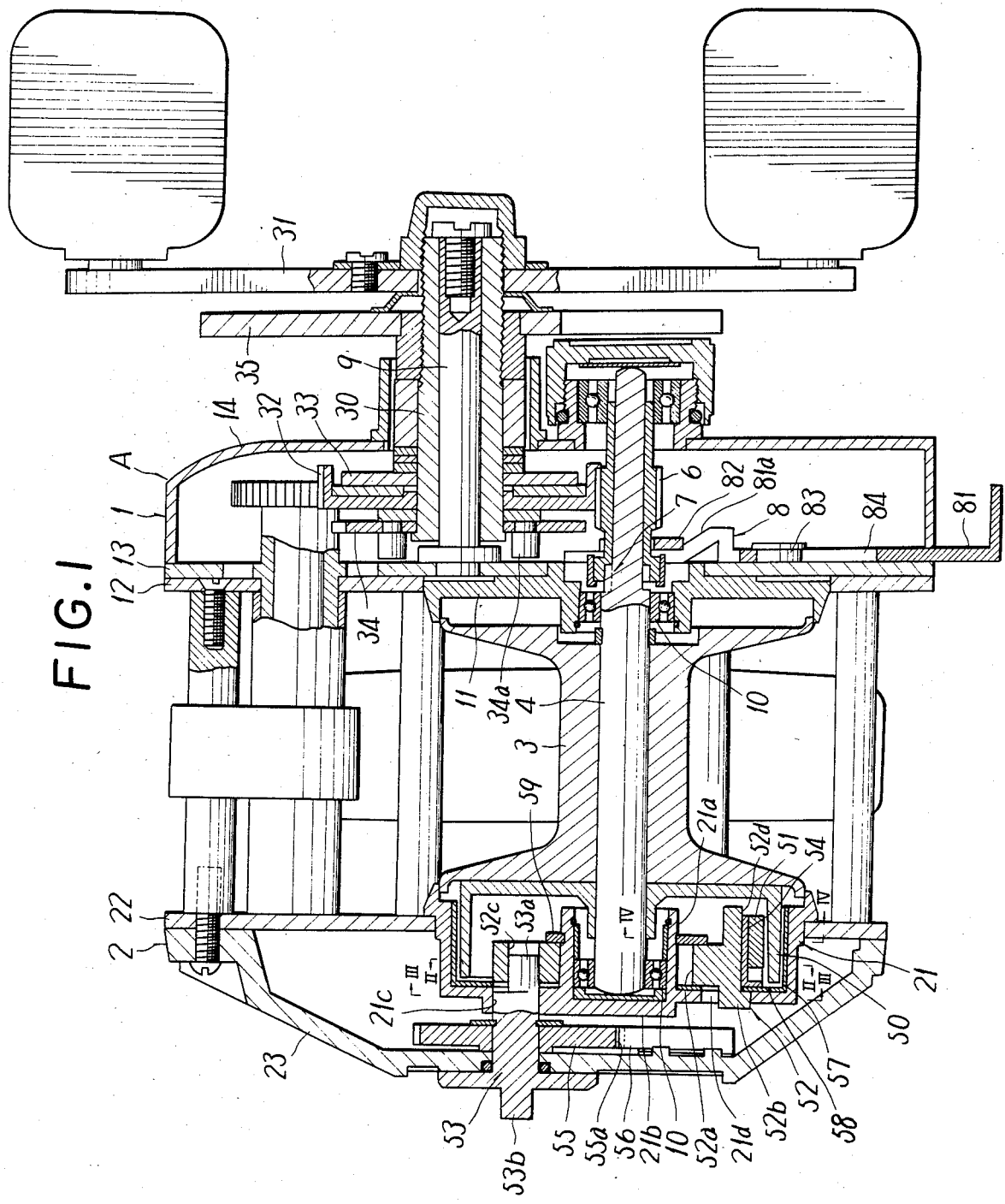
FIG. 1 is a cross-sectional plan view of an embodiment of a fishing reel of the invention.

In FIG. 1, reference A designates a reel body comprising a pair of first and second side frames 1 and 2 opposite to each other, the first side frame 1 comprising a side plate 12 having at the center a bearing housing 11, a doubling plate 13 attached to the outside of side plate 12, and a cup-like cover 14 attached to the outside of the doubling plate 13, the second side frame 2 comprising a side plate 22 having at the center a bearing housing 21 and a cup-like cover 23 attached to the outside of the side plate 22, the bearing housing 21 encasing therein a brake 5 to be discussed below.

A spool shaft 4 having a spool 3 is journalled to the first and second side frames 1 and 2 through bearings 10 and projects outwardly at one axial end at the first side frame 1 side and enters into the side frame 1, so that the projection carries a pinion 6 rotatably and axially slidably. A clutch 7 is provided between the pinion 6 and the spool shaft 4 and engages or disengages by a clutch lever 81 at a clutch operating mechanism 8.

A handle shaft 30 is suppoted rotatably to the doubling plate 13 and cover 14 at the first side frame 1 through a support shaft 9 and projects at one axial end outwardly from the cover 14, the one projecting end fixing a handle 31 and the other axial end carrying a master gear 32, a friction plate 33, and a return plate 34 having a plurality of projections 34a.

The friction plate 33 and return plate 34 are fitted onto the handle shaft 30 not-rotatably thereto but rotatably together therewith. The master gear 32 is freely fitted onto the handle shaft 30 so that the rotation is transmitted from the handle shaft 30 to the master gear 32 through the friction plate 33. In addition, a press-contact strength of friction plate 33 to the master gear 32 is adjustable by an adjuster 35 screwable with one axial end of handle shaft 30.

The clutch 7 comprises flat portions provided at an intermediate portion of spool shaft 4 and a cylinder provided at the pinion 6 and having a not-round inner surface engageable with the flat portions, so that the clutch operating mechanism 8 is operated to disengage the cylinder at the pinion 6 from the flat portions at the spool shaft 4, thereby making freely rotatable the spool shaft 4 and the spool 3 fixed thereto.

The clutch operating mechanism 8 comprises a clutch yoke 82 supporting the pinion 6 and biasing it always in the direction of coupling the clutch 7, a bifurcate clutch lever 81 having a biasing portion 81a for biasing the clutch yoke 82, and the return plate 34, the clutch lever 81 being supported to the doubling plate 13 movably in reciprocation in the direction perpendicular to the spool shaft 4 through a pin 83 and an elongate slot 84. A return spring (not shown) biases the clutch lever 81 in the direction of backward movement thereof to axially move the clutch yoke 82, thereby moving the pinion 6 in the direction of disconnecting the clutch 7. While, the handle 31 is rotatable to hit the projection 34a at the return plate 34 against a contact (not shown) provided at the utmost end of clutch lever 81 to return the clutch lever 81 by the spring force of the return spring, thereby moving the pinion 6 by the biasing force of clutch yoke 82 in the direction of coupling the clutch 7. The clutch lever 81 is swingable around the pin 83 at the doubling plate 13 and has an engaging portion at the utmost end, the engaging portion engaging with a cutout stepped portion at the doubling plate 13, thereby holding the clutch lever 81 in the position where the movement of lever 81 terminates. In addition, such construction alternatively may use a torsion spring as the return spring which biases the clutch lever 81 to be changed-over between the forward and backward movement terminations.

This invention provides, in the fishing reel constructed as the above, a brake 5 for spool 3 in free rotation.

Figure 2:
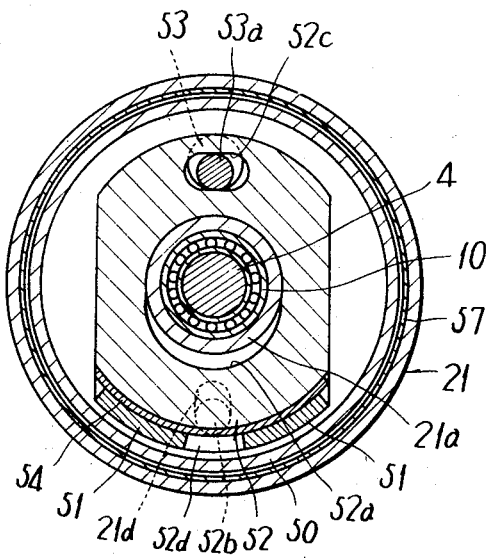
FIG. 2 is a sectional view taken on the line II—II in FIG. 1.

In detail, a cylindrical electric conductor 50, as shown in FIGS. 1 and 2, is mounted concentrically to the spool shaft 4. A non-magnetic magnet-holder 52, which carries at the outer periphery a magnet 51 opposite to the inner periphery of conductor 50 and has at the center a radially elongated shaft bore 52a, is supported on the outer surface of a support cylinder 21a provided at the center of bearing housing 21, the holder 52 being movable radially with respect to the support cylinder 21a. A bearing bore 21c and a guide bore 21d for guiding the holder 52 radially thereof are provided at the bottom wall 21b of the bearing housing 21 and shifted from the center thereof respectively, so that an engaging projection 52b provided at the lateral side of holder 52 is fitted into the guide bore 21d and engages therewith. The bearing bore 21c rotatably supports a control member 53 which has at one end an eccentric cam shaft 53a and at the other end a rotary control knob 53b, the cam shaft 53a insertably engaging with a bore 52c provided at the holder 52, the knob 53b extending outwardly from the cover 23 to be operable from the exterior, so that the control member 53 rotates to move the holder 52 radially with respect to the support cylinder 21a, thereby adjusting the magnet 51 in position with respect to the conductor 50.

Figure 6:
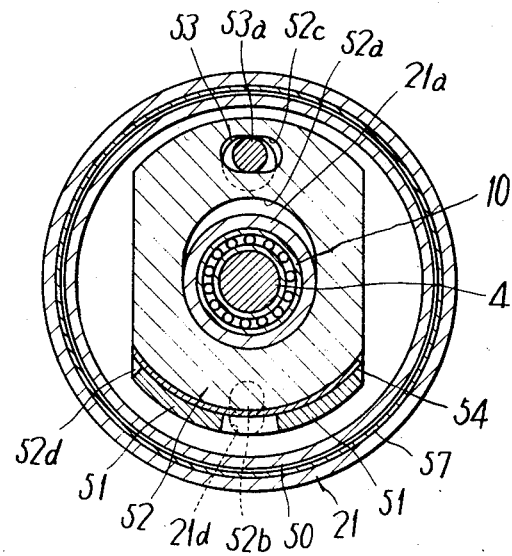
FIG. 6 is a view explanatory of the braking effect in adjusted condition.

The magnet 51 is carried at one side of the outer periphery of the cylindrical holer 52 and made adjustable in a range from the position (shown in FIG. 2) where a clearance between the conductor 50 and the holder 52 is the maximum, to the position (in FIG. 6) where the clearance is the minimum, and comprises one N-pole magnet and one S-pole magnet as shown. Also, the magnet 51 is fixed through a magnetic plate 54 into a recess 52d formed at the outer periphery of holder 52, by use of a fixing means, such as an adhesive. Alternatively, the holder 52 may be made from synthetic resin, so that the magnet 51 may be embedded integrally into the holder 52 when molded.

Figure 3:
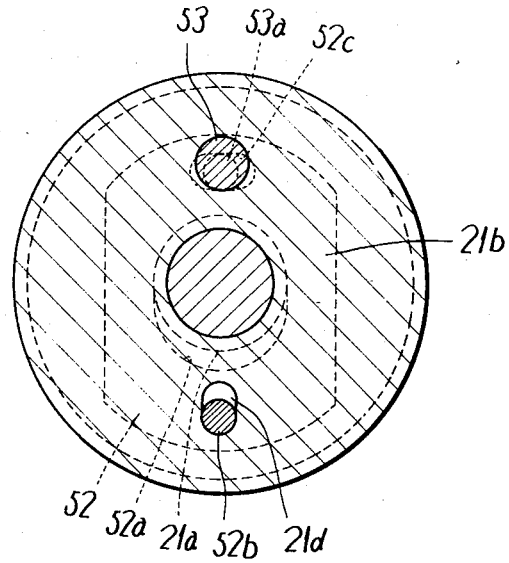
FIG. 3 is a sectional view taken on the line III—III in FIG. 1.
Figure 4:
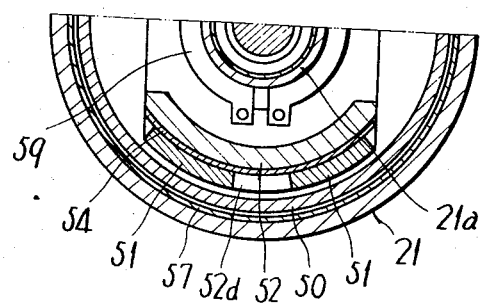
FIG. 4 is a sectional view taken on the line IV—IV in FIG. 1.

The engaging bore 52c at the holder 52 is elongate perpendicularly to the direction of moving the holder 52 as shown in FIG. 2, so that the control member 53 rotates to move the holder 52 only by an eccentricity of cam shaft 53a in engagement with the bore 52c. The guide bore 21d is elongate in the direction of moving the holder 52 as shown in FIG. 3, thereby preventing the holder 52 from rotating with respect to the support cylinder 21a, thus moving the holder 52 only radially thereof. Now, when the clutch lever 81 is operated to disconnect the clutch 7 and allow the spool 3 to freely rotate for casting, the conductor 50 mounted to the spool 3 or spool shaft 4 rotatably together therewith, rotates within the magnetic field of magnet 51, so that the magnetic flux passing through the conductor 50 changes its direction into the rotating direction of conductor 50, thereby generating an eddy current therein. Hence, Fleming's left-hand rule generates a magnetic force reverse to the rotation direction of conductor 50 to thereby exert the braking action on the spool 3.

Such braking action is controllable by the control member 53 for adjusting the holder 52 in position. Namely, the control member 53 is rotated to change the engaging position of the cam shaft 53a with the engaging bore 52c so that the holder 52 moves radially with respect to the support cylinder 21a. Hence, the magnet 51 held on the holder 52 changes in position radially toward or away from the conductor 50 to change the magnetic flux density for the conductor 50, thus adjusting the braking effect on the spool 3.

Figure 5:
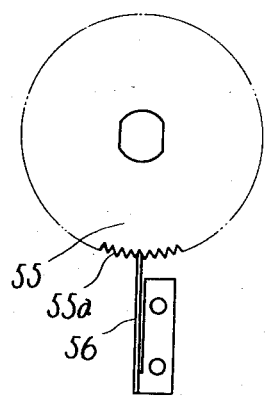
FIG. 5 is a view explanatory of a mechanism for maintaining the braking effect in an adjusted condition.

This adjustment, for example as shown in FIGS. 1 and 5, can be maintained by use of a positioning ring 55 having a number of serrations 55a at the outer periphery and of a retainer 56 engageable with the serrations 55a. In this case, the ring 55 is mounted to the control member 53 rotatably together therewith, and the retainer 56 is formed of a flexible plate member and fixed at one end to the inner surface of cover 23 by a fixing means, such as calking, and engages at the other end with the serrations 55a. In addition, the retainer 56, when the control member 53 rotates, is bent to disengage from the serrations 55a.

Reference numeral 57 in FIG. 1 designates a magnetic ring provided at the inner periphery of bearing housing 21 opposite to the conductor 50. The ring 57 is preferable to provide a bridge member 58 which contacts with the magnetic plate 54 at the holder 52 and forms the magnetic path across the magnet 51, conductor 50 and ring 57 as shown in FIG. 1. Also, 59 designates a C-like snap ring to restrain the holder 52 from axially moving with respect to the support cylinder 21a.

Alternatively, the control member 53', as shown in FIG. 7, may be provided concentrically with the conductor 50 and a cam groove 53c may be provided at the control member 53' and an engaging projection 52b' may be provided at the holder 52. In this case, the control member 53' is disc-like shaped and provides at the inner surface the cam groove 53c of a circular arc displaced toward the center, in other words, extending spirally, and the engaging projection 52b' is inserted through the guide bore 21d at the bearing housing 21 and engages with the cam groove 53c, so that the control member 53' rotates to change the engaging position of projection 52b' with the cam groove 53c, thereby moving the holder 52' radially with respect to the support cylinder 21a.

Also, the control member 53' may be slidably supported to move the holder 52' radially with respect to the same.

Alternatively, the support means for the holder 52 may be constructed as shown in FIGS. 9 through 12.

In detail, a ring-like-shaped holder 520 is disposed outside the outer periphery of the electric conductor 50 concentric with the spool shaft 4. The holder 520 supports at one side circumferentail thereof a magnet 51 opposite to the outer periphery of conductor 50, and an annular support portion 21e deviating at the center $O_2$ thereof from the axis $O_1$ of rotation of conductor 50 is provided on the outer periphery of support cylinder 21a provided at the center of bearing housing 21. The holder 520 is supported eccentrically rotatably onto the support portion 21e, so that the magnet 51 is adjusted in position radially toward or away from the conductor 50 while circumferentially moving with respect thereto.

In this case, a cylindrical control member 530 with a bottom wall is supported rotatably to the inner periphery of support cylinder 21a, and a rotary control knob 531, which is exposed outwardly from the cover 23 to be controllable from the reel exterior, is mounted at the outer surface of control member 530 through a set screw 532. At the axial end of the cylindrical control member 530 is fixed a cylinder 533 having at the utmost end two engaging projections 533a engageable with two recesses 520a at the holder 520 respectively. Thus, the knob 531 is rotated to allow the holder 520 to rotate eccentrically with respect to the support cylinder 21a, thereby adjusting the magnet 51 in position radially toward or away from the conductor 50.

In the above construction, the magnet 51 held at one side circumferential of the holder 520 is adjustable from the position (in FIG. 10) where a clearance between the conductor 50 and the holder 520 is the maximum, to the position where the clearance is the minimum, and comprises one N-pole magnet and one S-pole magnet as shown. Also, the magnet 51 is inserted into through bores 520b at the holder 520 and fixed thereto by a ferromagnetic ring 570, or may be fixed the same way as the first embodiment.

In this construction, when the spool 3 freely rotates for casting, the eddy current also is generated as in the first embodiment and under Fleming's left-hand rule a magnetic force is generated reverse to the rotation direction of conductor 50, thereby braking the spool 3.

This braking effect is controllable by adjusting the control member 530. Namely, the knob 531 is rotated to circumferentially move the holder 520 through the control member 530, cylinder 533, engaging projections 533a and engaging recesses 520a. Hence, the magnet 51 at the holder 520 changes in position radially toward or away from the conductor 50 and the magnetic flux density thereto changes to adjust the braking effect on the spool 3.

This adjustment is kept, for example, by an elastic rubber ring 60 as also shown in FIG. 7 interposed between the control member 530 and the bearing housing 21. In other words, the control member 530 is subjected to a rotational resistance by the ring 60, thereby avoiding careless rotation and maintaining the adjusting condition. In addition, in the drawings, reference numerals 61 and 62 designate washers for fixing the bearing 10, and 63 designates a C-like snap ring.

Alternatively, in the second embodiment, the holder 520 may be provided radially inwardly of the conductor 50 and the control member 530 radially outwardly thereof as shown in FIG. 1.

Alternatively, two or more magnet-holders 521 and 522, as shown in FIG. 14, may be axially juxtaposed. In this case, the holders 521 and 522 carry magnets 511 and 512 disposed at a phase difference of 180° and opposite to the conductor 50 respectively, are supported radially movably to the support cylinder 21a, and are provided with engaging projections 521a and 522a projecting through a pair of elongate slots 21f and 21g provided at the bearing housing 21. A control member 536 having a knob 535 exposed outwardly to be operable from the exterior is supported rotatably to the outside of bearing housing 21, and is provided with spiral engaging grooves 537 and 538 similar to the groove 53c in FIGS. 7 and 8, so that the projections 521a and 522a engage with the grooves 537 and 538 respectively. In addition, the components in FIG. 14 corresponding to those in FIGS. 1 and 9 are designated by the same reference numerals.

As seen from the above, the fishing reel of the invention, which has the cylindrical electric conductor rotatable together with the spool and the holder having the magnet opposite to the conductor, utilizes the magnetic force to exert the braking action on the spool and freely adjusts the magnet in position radially toward or away from the conductor, thereby enlarging the range of adjusting the braking effect by the control member with accuracy and enabling a fine adjustment, thus reliably preventing backlash.

Furthermore, the simple construction of supporting the holder radially movably or eccentrically rotatably with respect to the center of rotation of the conductor, can restrict a space for enlarging the adjustment range and be small-sized and inexpensive to produce while the range is enlarged.

Although several embodiments have been described, they are merely exemplary of the invention and not to be constructed as limiting, the invention being defined solely by the appended claims.

What is clamed is:

1. A fishing reel comprising a spool and a magnetic brake for reducing an overrun of said spool, said reel being provided with a frame member which rotatably supports said spool, a cylindrical electric conductor rotatable together with said spool, and a magnet holder having at least one magnet positioned at one side of said holder radially of said conductor and opposite thereto, said holder having a support means which supports said holder to said frame member so that said holder and said magnet are adjustable in position radially toward or away from said conductor to adjust a gap in a radial direction between said magnet and said conductor to thereby adjust the braking effect exerted on said conductor, said support means incuding a control member which controls movement of said holder and the adjusted position of said magnet, said frame member having a support cylinder which rotatably supports said spool, and said support means supporting said magnet holder to said support cylinder to be slidable radially of said conductor.

2. A fishing reel comprising a spool and a magnetic brake for reducing an overrun of said spool, said reel being provided with a frame member which rotatably supports said spool, a cylindrical electric conductor rotatable together with said spool, and a magnet holder having at least one magnet positioned at one side of said holder radially of said conductor and opposite thereto, said holder having a support means which supports said holder to said frame member so that said holder and said magnet are adjustable in position radially toward or away from said conductor to adjust a gap in a radial direction between said magnet and said conductor to thereby adjust the braking effect exerted on said conductor, said support means including a control member which controls movement of said holder and the adjusted position of said magnet, said control member being supported rotatably to said frame member and having a cam groove extending spirally with respect to an axis of rotation of said control member, and said magnet holder having an engaging projection engageable with said cam groove.

* * * * *